Oct. 28, 1941.     C. A. CAMPBELL     2,260,434
AIR BRAKE
Filed Oct. 23, 1939     2 Sheets-Sheet 1
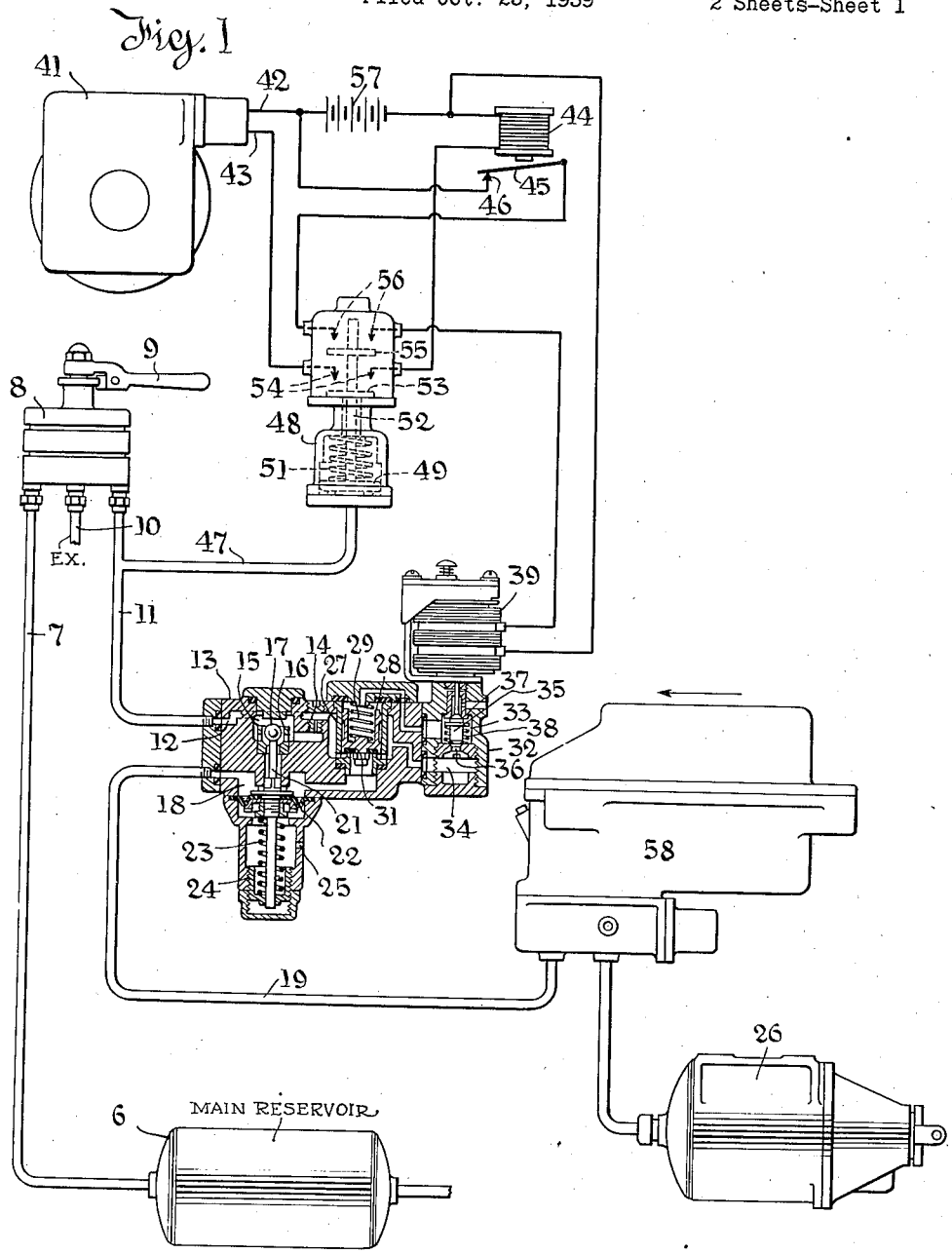
Inventor
Charles A. Campbell
By
Attorneys

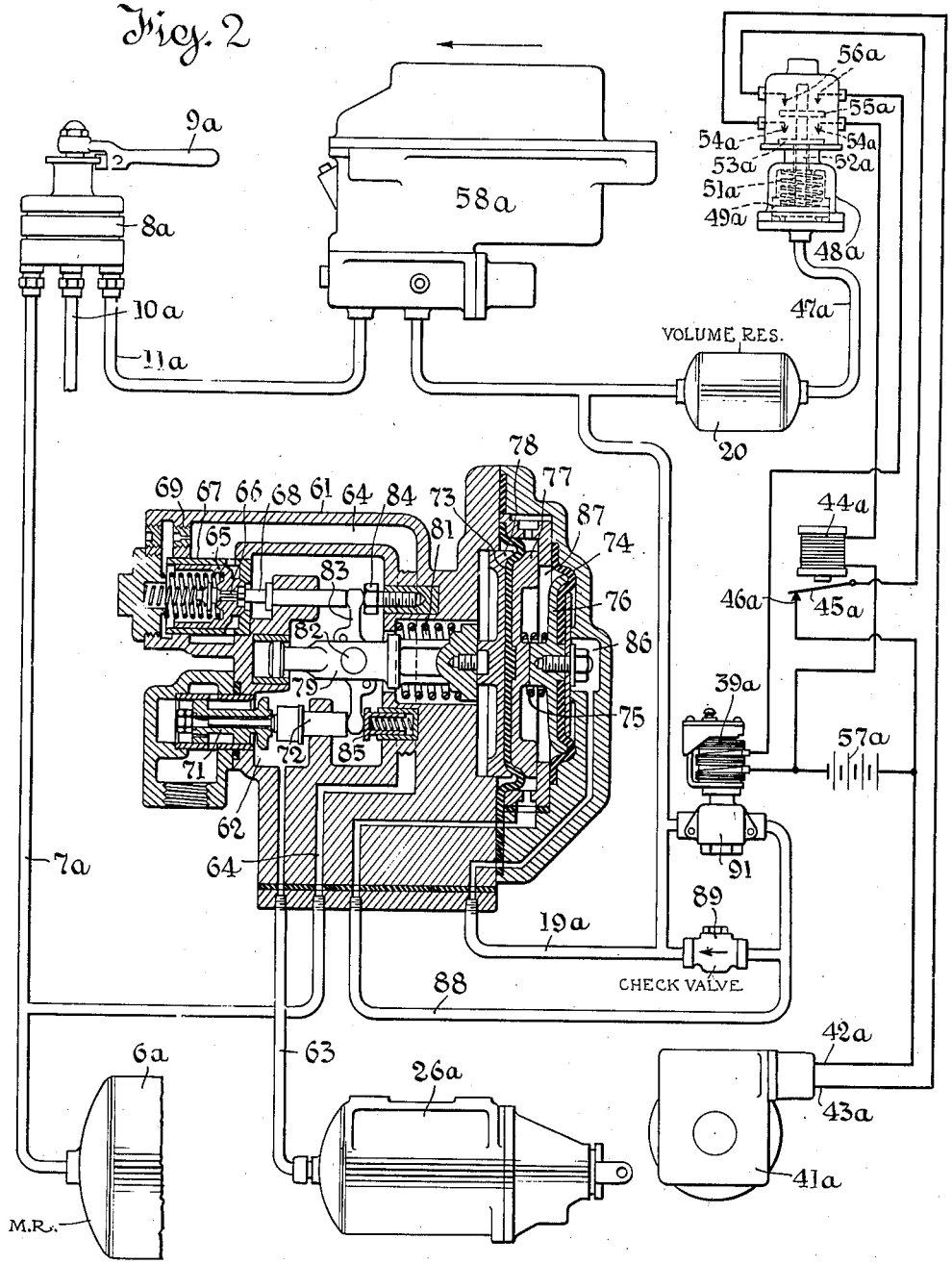

UNITED STATES PATENT OFFICE 2,260,434

AIR BRAKE

Charles A. Campbell, Watertown, N. Y., assignor to The New York Air Brake Company, a corporation of New Jersey Application October 23, 1939, Serial No. 300,825

5 Claims. (Cl. 303—21)

This invention relates to air brakes and particularly to means for limiting the intensity of an application by means responsive to train speed, and functioning in such a way that an unduly intense application can never be made at low speed.

The device is in the nature of an improvement on similar devices disclosed in co-pending applications Serial No. 250,665, filed January 12, 1939, since issued as Patent No. 2,198,760, April 30, 1940, and Serial No. 300,824, filed October 23, 1939.

The invention will be described as used in conjunction with a deceleration controller to establish a limit in the intensity of brake applications made at speeds below a definite value, say 60 M. P. H. The earlier of my two prior applications indicates how a plurality of such limits may be set for a series of speeds and that scheme may be used with the present invention.

One important feature of the present invention is the use of a speed controlled switch that is either opened or closed in response to change of speed past the control point, particularly one which closes below and opens above such control point. Another feature is a reset switch which opens all circuits as an incident to the release of the brakes.

Another feature illustrated in one embodiment of the invention is the use of multiple relays to give a plurality of braking ratios. For simplicity, a duplex relay which gives only two ratios, is shown, but since multiple relays are known, it requires only the use of a more elaborate relay and the simple duplication of the control elements to establish more than two braking ratios.

The invention might be used with any speed responsive device capable of causing alternative energization and de-energization of a relay circuit, according to speed. It will be described in connection with a governor switch of known type which is arranged to close the circuit below a chosen speed, say 60 M. P. H., and open it above that speed.

Two embodiments of the invention are illustrated in the accompanying drawings in which—

Figure 1 is a view more or less diagrammatic in character showing the invention arranged to control a pressure limiting valve by means of an electrically actuated by-pass valve therearound.

Figure 2 is a similar view showing a modification in which a multiple diaphragm relay is substituted for the limiting valve and by-pass valve.

Referring first to Figure 1, a main reservoir or other source of air under pressure 6 supplies air through connection 7 to an engineer's brake valve 8. This is of the ordinary straight-air type manipulated by a handle 9 and serving to connect a brake pipe 11 with the supply line 7 and with an exhaust connection 10 (or, in lap position, to disconnect it from both).

The brake pipe 11 leads to a port 12 in the housing 13 of the pressure limiting valve. The port 12 delivers through a flow restricting choke 14 to a chamber 15. In this chamber is mounted a cup-like valve seat 16. Coacting with this seat is a captive ball check valve 17. The check valve controls flow between chamber 15 and a second chamber 18 formed in the housing 13 and connected with a pipe known as the "control" pipe indicated by the numeral 19.

The valve 17 is normally held off its seat by a stem 21. This stem is connected to the center of a flexible diaphragm 22 and is urged upward, that is, in a direction to unseat the valve, by a coil compression spring 23. The stress on this spring is regulated by a nut 24.

It will be observed that the chamber 18 above the diaphragm 22 is subject to pressure in the control pipe 19 and the lower side of the diaphragm is subject to atmospheric pressure admitted through a vent 25.

It follows that if the valve handle 9 be moved to application position and air under pressure be admitted to pipe 11, and consequently to chamber 15, flow will continue past the valve 17 until pressure in the chamber 18 rises to a value determined by the adjustment of the spring 23. Thereafter, the depression of the diaphragm will permit the valve to close and preclude further flow.

The pipe 19 could lead directly to any brake applying device, here typified by a brake cylinder 26. It should be understood that by any brake applying device, I mean to include the pressure chamber of a relay, a control chamber such as is used in conventional high speed brake systems, and, in fact, any fluid pressure operated brake applying means, whether it operates a single piston or whether it operates through accessory means to apply a plurality of brakes throughout a car or even a train.

While the pipe 19 might be connected directly to the brake cylinder 26, I show the interposition of a deceleration controller 58 of the type illustrated in the patent to Campbell 2,136,578, issued November 15, 1938. The details of construction are not material and are not illustrated. Such deceleration controller involves a mass guided to move in the direction of train travel against spring resistance. This mass thus operates to weigh the deceleration produced by a brake application. It is connected to operate a balanced piston valve which, when the desired deceleration rate is reached, interrupts communication between the control pipe 19 and the brake applying device 26. Further, when the deceleration rate is exceeded, the balanced piston valve moves further and releases air under pressure from the brake applying device, until the deceleration rate is reduced the proper amount.

Deceleration controllers of this type include a release by-pass check valve so that releasing flow from the brake applying device 26 to the control pipe 19 may occur at any time without interference by the deceleration controller.

To render the pressure limiting valve, above described, impotent to limit intensity of brake application, a by-pass valve is provided to connect the port 12 with a chamber 18. This comprises a valve bushing 27 in which is mounted a cup-like valve 28. This valve is urged downward in a seating direction by a coil compression spring 29. It has on its lower end a sealing gasket 31 which coacts with a rim on the lower end of the bushing 27, this rim or valve seat surrounding a port leading to the chamber 18. The bushing 27 is so ported that fluid pressure arriving by way of pipe 11 and port 12 acts on an annular area on the lower end of valve 28 outside the gasket 31. Thus, pressure developed in the pipe 11 exercises an opening tendency on the valve 28 and will force it open against the resistance of spring 29 if the upper face of valve 28 be exposed to atmospheric pressure. When it starts to open, the valve 28 moves full stroke and opens wide because of the increased area exposed to pressure. This valve mechanism will be recognized as conforming to what is commonly called a "protection valve."

If the space above the valve 28 is subject to the pressure in pipe 11, then, obviously, the valve will not open, irrespective of what pressure exists in pipe 11. To control the valve, means are provided to subject the upper end of the valve 28 to pressure in the pipe 11 or alternatively to atmospheric pressure, to insure that it is closed or opened respectively.

A magnet valve housing 32 is mounted on the housing 13. It contains a valve chamber 33 connected by a port with the space above the valve 28, and a supply chamber 34 connected with a branch or port 12, and consequently with the pipe 11. In the chamber 33 is a double-beat poppet valve 35 which may seat either against a supply seat 36 to close communication from supply chamber 34 to the chamber 33 or against an exhaust seat 37 to close communication between the chamber 33 and atmosphere. The valve is normally held against the exhaust seat by a coil compression spring 38 but may be shifted away from the exhaust seat and into closing relation with the supply seat upon excitation of a magnet winding 39.

The mechanism indicated generally at 41 is a speed responsive device of commercial form whose particular construction is not a feature of the invention.

Assuming that the control is to be exercised at 60 M. P. H., the function of the device 41 is to connect the leads 42 and 43 whenever speed is below 60 M. P. H. and disconnect them when it is at or above 60 M. P. H. The coil 44 forms part of a relay switch. When energized, it attracts the contactor 45, lifting it away from the contact 46. Connected by a branch 47 with brake pipe 11 is the lower end of a cylinder 48. In this cylinder there works a piston 49 urged downward by a coil compression spring 51. A stem 52 connected with the piston 49 carries two contactors, a lower contactor 53 which bridges a pair of contacts 54 and an upper contactor 55 which bridges a pair of contacts 56. In the normal downward position of the piston 49, shown in the drawings, the contactors 53 and 55 are in circuit-breaking position. However, upon a slight development of pressure in pipe 11, say about 5-lbs. gage, the piston moves upward and both sets of contacts 54 and 56 are connected.

One of the terminals 42 is connected to one terminal of a battery 57. The same terminal of the battery is connected to the contact 46. The contactor 45 is connected to one contact 56 and the other contact 56 is connected with one terminal of winding 39. The other terminal of the winding 39 is connected with the second terminal of the battery 57 and also with one terminal of the winding 44. The other terminal of the winding 44 and the terminal 43 of the speed controlling switch are connected to the contacts 54. These connections are clearly shown in the drawings.

The operation can readily be described. Suppose that a brake application is started at a speed below 60 M. P. H. At such speed, the terminals 42 and 43 are connected. As soon as 5-lbs. gage is developed in the pipe 11, the contacts 54 and 56 are bridged. The effect is to excite the winding 44, lift the contactor 45 and interrupt the circuit which would otherwise exist through the winding 39. Thus, the double-beat poppet valve 35 remains against the exhaust seat. Valve 28 does not open so the pressure limiting valve limits the pressure which can be developed from a brake-applying device 26.

Since the deceleration controller can not respond until actual deceleration occurs, the pressure limitation thus imposed is wholly independent of any operation of the deceleration controller, but the limitation is so selected that the application produced will not be so violent as to cause the deceleration controller to overthrow and hunt.

Now suppose that the application is made when the speed is above 60 M. P. H. Contacts 54, 56 are connected before the application takes effect, as above described. However, terminals 42 and 43 are not connected, so that winding 44 is not excited; contact 45 remains in its circuit closing position; and the winding 39 is energized. In consequence, the valve 35 is shifted from the exhaust to the supply seat and valve 28 opens under pressure arriving through the pipe 11. Thus, the pressure limiting valve is by-passed and the pressure in the brake applying device 26 may rise without limitation until the response of the deceleration controller cuts off flow from the control pipe 19 to the brake-applying device.

Thus, at low speeds, a definite limitation is placed on initial intensity of brake application. At high speed, no such limit is imposed.

While only one stage of speed control is illustrated, more can be used according to the principle set forth in my prior application, above-described.

It is important to observe that because the circuits are broken at the contacts 54 and 56, as a necessary incident to release of the brakes, the circuits are opened and kept open at all times when the brakes are released.

In Figure 2, a modified construction is shown in which there is substituted for the limiting valve and by-pass a duplex relay, i. e., a relay having two diaphragms of different areas so arranged that the pressure in the brake applying device, or brake cylinder, operates against the larger diaphragm at all times.

When the control pipe pressure is allowed to act in opposition on the larger diaphragm, a full braking force is developed. When, however, the control pipe pressure is allowed to act only against the smaller diaphragm, a lower braking ratio, say six-tenths ($\frac{6}{10}$) of the maximum is developed. Thus, a magnet valve having a winding which is the analogue of the winding 39 is used to connect and disconnect the control pipe from the working space behind the larger diaphragm.

The ultimate effect is similar to that secured by a pressure limiting valve and by-pass arrangement shown in Figure 1.

Many components used in Figure 2 are identical with those in Figure 1, but the arrangement is slightly different, some of the differences being entailed by the use of the relay in place of the limiting valve and other changes being made simply to indicate the possibility of alternative arrangements.

Referring now to Figure 2, those components which are the same will be briefly mentioned. The main reservoir and the brake valve components 6a to 11a, inclusive, are the same and are arranged in the same way. There are no parts analogous to the parts numbered 12 to 38 in Figure 1, except there is a control pipe 19a and a brake-applying device 26a which may be a brake cylinder, a control chamber, and so forth, as above explained.

The winding 39a is the analogue of the winding 39 but instead of operating a double-beat poppet valve, it operates when energized to open a normally closed stop valve which controls flow from the control pipe 19a to the larger diaphragm chamber of the relay, as will be explained.

The parts 41a to 58a are the same as parts 41 to 58 in Figure 1, and the electric connections are identical, including the connections to the winding 39a. The piping connections differ somewhat. The deceleration controller 58a, which is identical with the deceleration controller 58 of Figure 1, is interposed between the straight-air pipe 11a and the control pipe 19a so that it exercises its modulating effect on the duplex relay instead of modulating the pressure established by the relay. Since the relay in Figure 2 is the pressure limiting device, the alternative arrangement suggests latitude in the location of the deceleration controller with respect to the pressure limiting device. The arrangements illustrated are considered preferable for the particular type of pressure control adopted in each case.

In Figure 2, the volume of the control pipe 19a is augmented by a volume reservoir 29, the purpose being to slow up the development of pressure acting on the relay. The branch 47a leading to the pressure switch leads from the control pipe 19a rather than from the straight-air pipe as in Figure 1. The two arrangements are full equivalents because the pressure switch responds in any event to the first increment of braking pressure, so there is no functional difference between the two arrangements illustrated.

The relay, which is of known type, is indicated generally by the numeral 61. A very brief description will suffice since no claimed novelty is predicated on the structure of the relay itself. Within the housing of the relay there is a valve chamber 62 which is connected by the pipe 63 with the brake cylinder 26a or equivalent mechanism for applying the brakes.

A branch of the main reservoir pipe 7a leads by way of a port 64 to an inlet valve mechanism comprising a main inlet poppet valve 65 and a pilot poppet valve 66, the main valve working in a bushing 67 and the pilot poppet valve controlling a port through the main valve. The two valves are individually seated by coil compression springs as shown, and are so arranged that the stem 68 unseats the pilot valve to relieve the unbalanced load on the main valve, and then unseats the main valve. The rate of supply flow through the valve is controlled by a choke 69. There is also a poppet exhaust valve 71 which may be forced in a seating direction by a stem 72.

The main diaphragm, i. e., the larger diaphragm, is shown at 73 and is subject on its inner (left-hand) side to the pressure in the chamber 62. There is also a smaller diaphragm 74 having an area, say, six-tenths ($\frac{6}{10}$) of the area of the diaphragm 73 where a six-tenths ($\frac{6}{10}$) ratios of pressure is desired. The diaphragms are clamped at their peripheries between the main housing of the valve and portions of the cap structure. The arrangement is clearly shown in the drawings and need not be explained in detail. A light spring 75 reacts between thrust plates clamped to the centers of the respective diaphragms. The thrust plate 76 connected with the smaller diaphragm reacts through thrust plates 77, 78, associated with the larger diaphragm upon a stem 79. This stem is urged to the right by a coil compression spring 81 and carries pinned to it at 82 a rocker arm 83. One end of this rocker arm reacts in thrust against the stem 68 and its motion to the right is limited by the adjustable stop 84. The other end of the rocker arm 83 reacts against the stem 72 and is urged against such stem by a spring stop 85.

Thus, there is a chamber 86 on the outer side of the smaller diaphragm and a chamber 87 between the two diaphragms. The control pipe 19a leads freely to the chamber 86 so that pressure in the control pipe always reacts against the outer side of the smaller diaphragm. A branch pipe 88 leads to the chamber 87 between the two diaphragms. Flow from the pipe 88 to the control pipe 19a is permitted at all times by the check valve 89, but this valve closes against reverse flow. However, a normally closed stop valve 91 is arranged to be opened when the winding 39a is energized. The valve 91 may be of any known construction affording the stated characteristics and therefore the details of construction are not illustrated.

Assuming that the speed control switch is set for 60 M. P. H. so as to close the circuit between the leads 42a and 43a below 60 M. P. H. and open it above 60 M. P. H., the principle of operation is as follows: Suppose an application is made below 60 M. P. H. Rising pressure in the straight-air pipe 11a will be communicated directly to control pipe 19a. Winding 44a will be energized and contactor 45a will be lifted and circuit through the winding 39a will be interrupted. Hence, the valve 91 remains closed and the control pipe pressure will be admitted to the chamber 86 and operate on the smaller diaphragm so the effective braking pressure of a brake applying device 26a will be limited to say, six-tenths (6/10) of the maximum pressure afforded by the system.

On the other hand, if the speed is above 60 M. P. H., the winding 44a will not be energized; the circuit through the winding 39a will be closed; and valve 91 will open, admitting pressure to pipe 88 and consequently to the chamber 87 between the diaphragms. This operates the relay at its high or one-to-one ratio, so that the pressure developed in the cylinder 26a will be the maximum afforded by the system.

Two embodiments of the invention have been illustrated and various other modifications are obviously possible within the scope of the inventive concept.

An important feature of the invention is that all control circuits are de-energized by the relays of the brakes so that the simple act of releasing the brakes resets the entire pressure limiting mechanism.

What is claimed is:

1. In a fluid pressure brake system, the combination of fluid pressure operated brake applying means; an engineer's brake valve for controlling the admission and release of pressure fluid to and from said means; pressure limiting valve means interposed between said brake valve and said brake applying means, responsive to fluid pressure on the side thereof which is toward the brake applying means and serving during such admission to limit the pressure developed in the brake applying means; electric means serving according to whether it is or is not energized to permit or suspend the function of said limiting means; a switch responsive to vehicle speed and arranged to open and close according to change of speed past a definite value; a relay switch including a winding and switch shiftable by the energization and de-energization thereof; a first circuit including the speed responsive switch and the winding of the relay; a second circuit including said electric means and the switch portion of the relay; a source of current for said circuits; and means effective in the release position of the engineer's brake valve to interrupt both circuits.

2. In a fluid pressure brake system, the combination of fluid pressure operated brake applying means; an engineer's brake valve for controlling the admission and release of pressure fluid to and from said means; pressure limiting valve means interposed between said brake valve and said brake applying means, responsive to fluid pressure on the side thereof which is toward the brake applying means and serving during such admission to limit the pressure developed in the brake applying means; electric means serving according to whether it is or is not energized to permit or suspend the function of said limiting means; a switch responsive to vehicle speed and arranged to open and close according to change of speed past a definite value; a relay switch including a winding and switch shiftable by the energization and de-energization thereof; a first circuit including the speed responsive switch and the winding of the relay; a second circuit including said electric means and the switch portion of the relay; a source of current for said circuits; and pressure actuated switch means effective when the brakes are released to interrupt both circuits.

3. In a fluid pressure brake system, the combination of a fluid pressure operated brake applying means; an engineer's brake valve for controlling the admission and release of pressure fluid to and from said means; a relay interposed between said engineer's brake valve and said brake applying means, said relay including ratio selecting means to establish selectively either of two different pressures in the brake applying means in response to a given brake-applying manipulation of the engineer's brake valve; means responsive to vehicle speed and controlling said ratio selecting means to determine the ratio according to whether speed is above or below a chosen value; and valve means responsive to vehicle deceleration adapted to modulate the pressure in said brake applying means to maintain, irrespective of the action of said ratio selecting means, a substantially uniform deceleration rate.

4. In a fluid pressure brake system, the combination of a fluid pressure operated brake-applying means; an engineer's brake valve for controlling the admission and release of pressure fluid to and from said means; a relay interposed between said engineer's brake valve and said brake applying means, said relay including ratio selecting means to establish selectively either of two different pressures in the brake-applying means in response to a given brake-applying manipulation of the engineer's brake valve; means responsive to vehicle speed and controlling said ratio selecting means to determine the ratio according to whether speed is above or below a chosen value; valve means of the admission and exhaust type interposed between said engineer's brake valve and said relay; and means responsive to vehicle deceleration connected to actuate the last-named valve means, and serving to maintain, irrespective of the action of said ratio selecting means, a substantially uniform deceleration rate.

5. In a fluid pressure brake system, the combination of fluid pressure operated brake-applying means; manually operable means for controlling the admission and release of pressure fluid to and from said brake applying means; pressure limiting valve means interposed between said brake valve and said brake applying means, responsive to fluid pressure on the side thereof which is toward the brake applying means and normally operative to limit pressure developed in the brake applying means to an amount less than the maximum pressure available; electric means serving, when energized, to suspend the function of said limiting means; a switch responsive to vehicle speed and arranged to open above a chosen speed and close below such chosen speed; a relay switch including a winding and a switch which is normally closed and which is shifted to open position upon energization of the relay winding; a first circuit including the speed responsive switch and the relay winding; a second circuit including said electric means and the switch portion of the relay; a source of current for said circuits; and pressure actuated switch means effective when the brakes are released to interrupt both circuits.

CHARLES A. CAMPBELL.